United States Patent [19]
Klomp et al.

[11] 3,868,930

[45] Mar. 4, 1975

[54] ROTARY ENGINE WITH AUXILIARY COMBUSTION CHAMBER

[75] Inventors: Edward D. Klomp, Mt. Clemens; James H. Wolgemuth; Harold V. Wiknich, both of Warren, all of Mich.

[73] Assignee: General Motors Corporation, Detroit, Mich.

[22] Filed: May 24, 1974

[21] Appl. No.: 472,943

[52] U.S. Cl. ............................. 123/8.13, 123/8.09
[51] Int. Cl. ........................................... F02b 53/04
[58] Field of Search ........ 123/8.13, 8.09, 8.11, 8.27

[56] References Cited
UNITED STATES PATENTS

| | | | |
|---|---|---|---|
| 3,227,145 | 1/1966 | Bernard | 123/8.27 |
| 3,391,677 | 7/1968 | Hejj | 123/8.09 |
| 3,508,530 | 4/1970 | Clawson | 123/8.09 |

Primary Examiner—C. J. Husar
Assistant Examiner—O. T. Sessions
Attorney, Agent, or Firm—Ronald L. Phillips

[57] ABSTRACT

A rotary engine having a lean air-fuel mixture delivered to the working chambers and having an auxiliary combustion chamber into which a portion of the lean mixture is drawn from the working chambers, enriched, ignited and then directed as burning gas into the remaining lean mixture in the working chambers without the escape of fresh charge to an exhausting leading chamber or burning gas to a trailing chamber.

4 Claims, 4 Drawing Figures

PATENTED MAR 4 1975  3,868,930

ROTARY ENGINE WITH AUXILIARY COMBUSTION CHAMBER

This invention relates to a rotary engine with an auxiliary combustion chamber and more particularly to such an engine wherein the auxiliary combustion chamber is scavenged.

Unlike reciprocating piston engines, the working chambers in a rotary engine are located adjacent each other about the rotor making it difficult to efficiently employ a precombustion chamber in an effort to reduce HC, CO and $NO_x$ emissions and also gain efficiency. Because the working chambers are adjacent each other, it is particularly difficult to scavenge the auxiliary combustion chamber in an attempt to obtain the best advantages therefrom since any fresh charge in the auxiliary combustion chamber should somehow be prevented from reaching an exhausting leading working chamber and furthermore the flame from the auxiliary combustion chamber should somehow be prevented from reaching the fresh charge in a trailing working chamber.

According to the present invention there is provided in a rotary combustion engine, an intake port through which a lean air-fuel mixture is drawn into the engine's working chambers. The engine is further provided with an auxiliary or precombustion chamber which communicates with the engine's working chambers through an inlet opening and an outlet opening which are peripherally spaced in trailing and leading locations, respectively, relative to rotor rotation. The lean air-fuel mixture in each of the working chambers enters the auxiliary combustion chamber through a spring biased check valve in the inlet opening and during the first part of the compression phase at which time the leading working chamber is in communication with the engine's exhaust port and also with the auxiliary combustion chamber via the outlet opening thereof. The arrangement's dimensional parameters affecting flow and the valve opening force are determined so that escape of fresh charge through the auxiliary combustion chamber to exhaust is prevented at all engine speeds and loads while the leading working chamber is open to both the auxiliary combustion chamber and exhaust. Eventually each working chamber in the compression phase is open to both openings to the auxiliary combustion chamber and full charging of the auxiliary combustion chamber then occurs. The lean mixture drawn off into the auxiliary combustion chamber is then enriched by fuel injection and ignited by a spark plug near the auxiliary combustion chamber's outlet, this location being such that there is provided delivery of very high temperature burning gases into the working chamber in the subsequent expansion phase to ignite the lean mixture remaining in the working chamber. A flame arrestor located upstream of the spark plug between the fuel injector and the check valve prevents flame from reaching the fresh charge in a trailing working chamber. Combustion continues with the lean mixture in the working chamber during the expansion or power phase and then during the exhaust phase, the products of combustion are exhausted from the engine.

An object of the present invention is to provide a new and improved rotary combustion engine with an auxiliary combustion chamber.

Another object is to provide in a rotary combustion engine, an auxiliary or precombustion chamber into which lean air-fuel mixture is drawn off from the main chambers through a trailing opening and also a leading opening, is then enriched and ignited and delivered as high temperature burning gases through the leading opening into the remaining lean mixture for combustion thereof without allowing fresh charge to escape through the exhaust or permitting flame in the precombustion chamber to reach the fresh charge in an advancing working chamber.

Another object is to provide in a rotary combustion engine a scavenged auxiliary combustion chamber to which a lean air-fuel mixture is drawn off from the main chambers through a check valve and is then ignited downstream of a flame arrestor after having been enriched and with the high temperature burning gases that result therefrom then being directed to ignite the remaining lean mixture in the main chambers.

These and other objects of the present invention will be more apparent from the following description and drawing in which.

Figure 1:
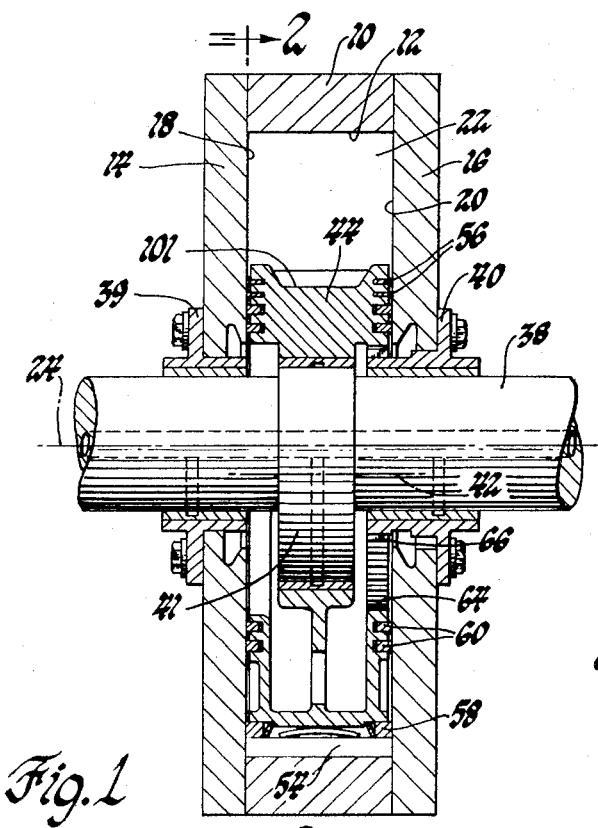
FIG. 1 is a longitudinal view with parts in section of a rotary combustion engine according to the present invention.
Figure 2:
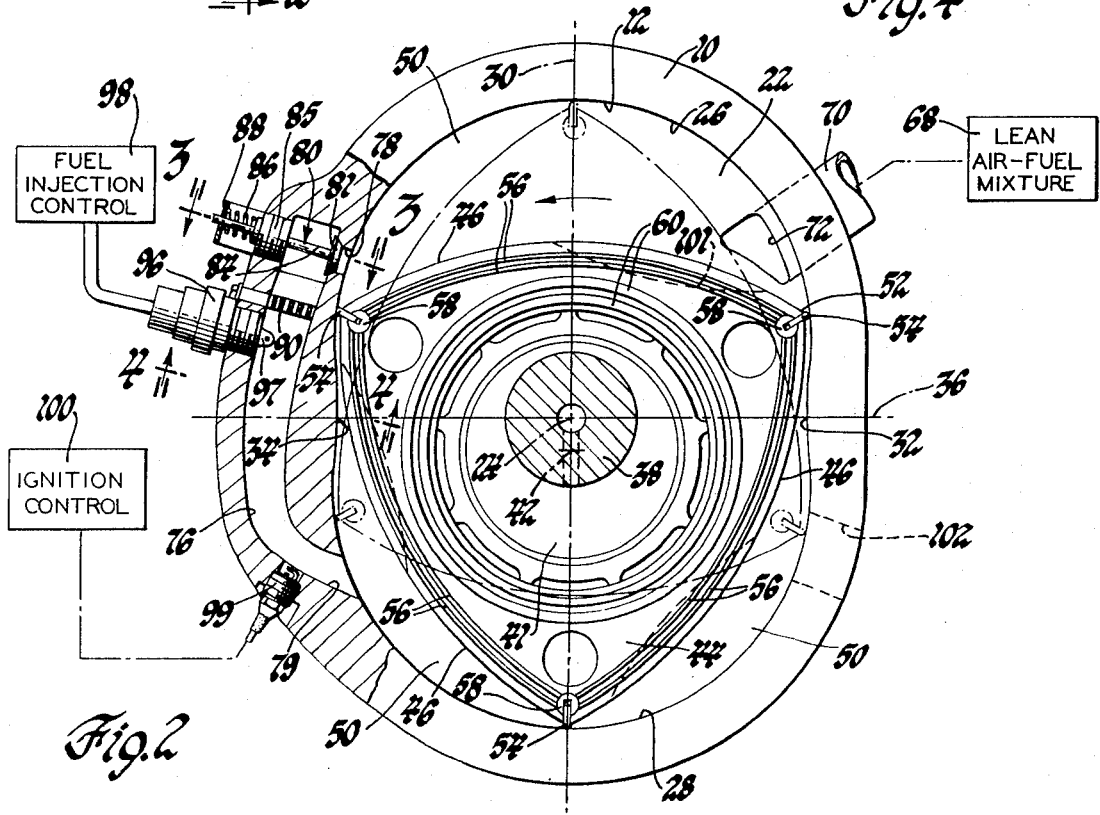
FIG. 2 is a view taken along the line 2—2 in FIG. 1 and further shows additional parts of the engine schematically.

Referring first to FIGS. 1 and 2, the invention is illustrated in a rotary engine having a rotor housing 10 with an inwardly facing peripheral wall 12 and a pair of end housings 14 and 16 with oppositely facing end walls 18 and 20 which cooperate with the peripheral wall 12 to define a cavity 22, these housing parts being clamped together by bolts, not shown. The peripheral wall 12 has the shape of a two-lobe epitrochoid or a curve parallel thereto whose center is indicated at 24 and comprises a pair of lobes 26 and 28 which are bisected by the curve's major axis 30 and a pair of cusps 32 and 34 which are bisected by the curve's minor axis 36, the axes intersecting at right angles to the center 24. A crankshaft 38 is rotatably mounted in collar assemblies 39 and 40 bolted to the end housings 14 and 16 so that its axis is coincident with the center 24. The crankshaft 38 has an eccentric 41 located in cavity 22 with its center line 42 offset and parallel to the crankshaft axis.

A three-lobe rotor 44 having the general shape of a triangle with three arcuate lobes or faces 46 facing the peripheral wall 12 is rotatably mounted on the crankshaft eccentric 41 for rotation about the eccentric's center line 42. The rotor faces 46 cooperate with the peripheral wall 12 and with the end walls 18 and 20 to define three variable volume working chambers 50 that are spaced about the rotor and move with the rotor within the engine housing while the three apexes 52 of the rotor remain adjacent the peripheral wall. Chamber sealing is provided by an apex seal 54 mounted in each apex or corner of the rotor 44, a pair of side seals 56 mounted in each rotor side and extending adjacent each rotor face between each set of adjacent apex seals, and a corner seal 58 mounted in each rotor side at each rotor apex providing a sealing link between the adjacent ends of two pairs of side seals and the apex seal at this rotor apex. The apex seals 54 are spring biased to continuously engage the peripheral wall 12 and both the side seals 56 and the corner seals 58 on each rotor side are spring biased to engage the opposite end wall with the complete sealing arrangement acting to seal the working chambers from each other. In addition, there is provided a pair of oil seals 60 mounted in each rotor side that are spring biased to engage the opposite end wall to prevent the oil used for lubrication from reaching outward to the working chambers.

With the two-lobe peripheral wall 12 and the three-lobe rotor 44, there are provided the four phases of intake, compression, expansion and exhaust in each working chamber in fixed relation to the housing when the rotor is appropriately forced to rotate at one-third the speed of the output shaft. This is accomplished by an internally toothed rotary phasing gear 64 which is formed on one side of the rotor concentric with the rotor hub and which meshes with an externally toothed stationary phasing gear 66 that is formed on the inboard end of the collar assembly 40. The gear 64 has one and one-half times the number of teeth as the gear 66 with which it meshes to provide the required speed ratio of 3:1 between the crankshaft and rotor.

The engine further has an induction system comprising a carburetor 68 that delivers a lean air-fuel mixture (compared to stoichiometric) to an intake manifold 70 that is secured to the engine housing and communicates with intake ports 72, only one of which is shown, which open to the rotor cavity 22 through the end walls 18 and 20. The intake ports 72 are located on the leading side of cusp 32 relative to the desired direction of rotor rotation indicated by the arrow in FIG. 2 so that the lean air-fuel mixture is periodically admitted to each working chamber 50 by the rotor sides uncovering the intake ports 72 while the chamber is expanding during its intake phase. As the rotor continues rotating, the sides of the rotor close off the intake ports and the working chamber with the fresh lean charge contracts in the compression phase in preparation for combustion.

Figure 3:
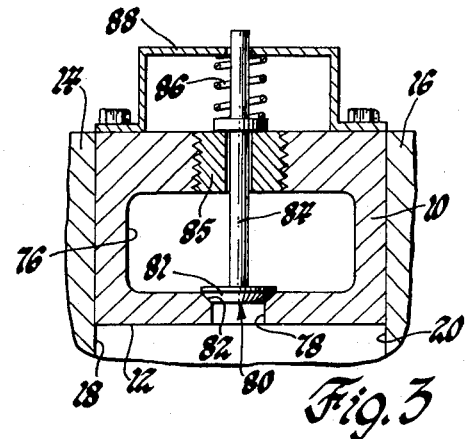
FIG. 3 is an enlarged view taken along the line 3—3 in FIG. 2.

Describing now the structure of the combustion producing arrangement, an auxiliary or precombustion chamber 76 is formed in the rotor housing 10 and extends peripherally through the minor axis 36 and opens to the rotor cavity 22 at two locations on either side of this axis, namely through an inlet opening 78 in the peripheral wall 12 on the trailing side of the cusp 34 and through an outlet opening 79 also in the peripheral wall 12 on the leading side of cusp 34. Thus, both the auxiliary combustion chamber openings 78 and 79 are swept by the apex seals 54 and thus communicate with the working chambers 50 according to rotor position. When the rotor lobes 46 are nearly or directly opposite the cusp 34 with the main chambers 50 then near or at minimum volume and the rotor thus near or at a top-dead-center position, the rotor lobes span both the auxiliary combustion chamber openings 78 and 79 so that the auxiliary combustion chamber is then connected to both the leading and trailing regions of the main chamber that is coming onto the expansion or power phase. On the other hand, when an apex seal 54 is between the two auxiliary combustion chamber openings 78 and 79, the auxiliary combustion chamber is then connected to the trailing region of a main chamber that is undergoing expansion but is also connected to a leading region of the trailing main chamber that is undergoing compression. To prevent backflow through the inlet opening 78, a spring biased check valve assembly 80 is provided comprising a poppet valve 81 that engages a valve seat 82 on the auxiliary combustion chamber side of the inlet opening as shown in FIGS. 2 and 3. The valve 81 is guided by having its stem 84 received in a bushing 85 threaded in the rotor housing 10. The valve 80 is biased to engage seat 82 by a coil spring 86 that is seated at its upper end on a cage 88 bolted to the rotor housing and is seated at it lower end on a collar on the stem 84.

Figure 4:
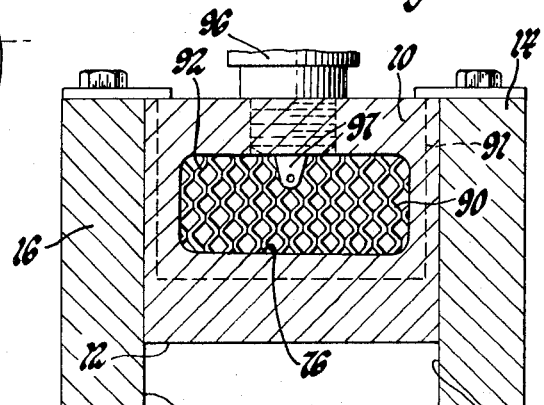
FIG. 4 is an enlarged view taken along the line 4—4 in FIG. 2.

Just downstream of the spring biased check valve 80 there is mounted a flame arrestor 90 which as best shown in FIG. 4 comprises a frame 91 that is secured in the rotor housing 10 crosswise of the auxiliary combustion chamber 76 and supports a honeycomb element 92 that permits gas flow therethrough while presenting a very large surface area to quench a flame and thereby provide a flame barrier as will be described in more detail later.

Mixture enrichment for initial combustion is provided by a fuel injector 96 which is secured to the rotor housing 10 and has an injector nozzle 97 that projects into the auxiliary combustion chamber 76 just downstream of the flame arrestor 90. The fuel injector 96 is supplied with fuel at the proper time by a fuel injector control system 98 as will be described in more detail later. Then, downstream of the fuel injector nozzle 97 there is provided a spark plug 99 which is mounted in the rotor housing 10 and has its electrodes exposed to the auxiliary combustion chamber near the outlet opening 79, the spark plug being supplied with energy at the proper time to initiate combustion by an ignition control 100 as will be described in more detail later.

Furthermore, each of the rotor faces 46 has a pocket or recess 101 in the trailing region thereof so that most of lean mixture carried in the working chambers 50 is located in the trailing regions thereof and remains there for the torch ignition provided as will be explained in more detail later. After the expansion or power phase, the working chambers 50 contract in the exhaust phase and the exhaust products of combustion are delivered to an exhaust port 102 in the rotor housing 10 that extends through the peripheral wall 12 on the trailing side of the cusp 32 adjacent the minor axis 36.

Describing now a typical operation of the engine arrangement together with the desired parameters to obtain the cycle of operation wanted, lean air-fuel mixture enters the working chambers 50 through the intake ports 72 during the intake phase whereafter the chambers are then closed on continuing rotor rotation and the lean air-fuel mixture trapped therein is compressed in the compression phase. As the pressure of the lean air-fuel mixture builds, the force it exerts on the check valve 80 in the inlet 78 eventually reaches a value sufficient to overcome the spring bias on this valve which then opens to permit the lean air-fuel mixture to enter the auxiliary combustion chamber 76. As shown by the dash-line rotor position in FIG. 2, the auxiliary combustion chamber 76 is open through the outlet opening 79 and the leading working chamber 50 to the exhaust port 102 when the lean air-fuel mixture is entering the auxiliary chamber 76 through the inlet opening 78. To compensate for this possible loss of fresh charge, the auxiliary combustion chamber porting and volume and the check valve opening pressure are selected to limit the flow rate sufficiently to prevent the escape of fresh charge out through the outlet opening 79 while the apex seals travel between the inlet and outlet openings and the then leading main chamber is open to exhaust at all engine speeds and loads. After the leading apex seal crosses the outlet opening 79, charging of the auxiliary combustion chamber then also occurs by reverse flow through this opening. In the meantime, the lean mixture in the auxiliary combustion chamber is enriched by operation of the fuel injection control 98 delivering fuel through the nozzle 97 at a point immediately downstream of the flame arrestor 90. Then after the leading apex seal crosses the trailing edge of the outlet opening 79, the ignition control 100 operates to energize the spark plug 99 which is located near this outlet to initiate combustion of the enriched fuel mixture. As a result, the combustion that occurs in the auxiliary combustion chamber 76 causes very high temperature burning gases to be expelled like a torch out the outlet opening 79 into the remaining lean air-fuel mixture in the main chamber and cause the combustion thereof. With the pockets 101 in the rotor faces located toward the trailing end of the main chambers, most of the lean mixture in the main chambers is thus forced to pass by this torch issuing from the auxiliary combustion chamber and be efficiently ignited thereby.

Thus, engine operating conditions are provided that are conducive to low HC, CO and $NO_x$ emissions while the overall lean mixture is conducive to improving efficiency and thus fuel economy under part-load operation.

The above described embodiment is illustrative of the invention which may be modified within the scope of the appended claims.

We claim:

1. A rotary combustion engine comprising housing means having opposing end walls and a peripheral wall cooperatively defining a cavity, a crankshaft rotatably supported in said housing means having an eccentric located in said cavity, for providing a fixed speed ratio between said rotor and said crankshaft so that said crankshaft is caused to rotate as said rotor executes planetary motion with a fixed cyclic relationship, said peripheral wall and said rotor cooperatively defining with said end walls a plurality of working chambers that are spaced about and move with said rotor while varying in volume, said housing means having an intake port open to said cavity located relative to rotor rotation so as to be opened past said rotor to said working chambers as they expand in an intake phase, lean air-fuel mixture supply means for supplying a lean air-fuel mixture to said intake port, said housing means further having an auxiliary combustion chamber with an inlet open to said cavity located so as to be opened past said rotor to said working chambers as they contract in a compression phase and having an outlet open to said cavity located so as to be opened past said rotor to said working chambers as they expand in an expansion phase, check valve means in said inlet for permitting the lean air-fuel mixture in said working chambers to flow into said auxiliary combustion chamber above a predetermined pressure as said working chambers are contracting and preventing flow in the opposite direction, fuel injection means for injecting fuel into the lean air-fuel mixture in said auxiliary combustion chamber downstream of said check valve means after the working chamber from which the lean air-fuel mixture has been obtained opens to said outlet of said auxiliary combustion chamber, ignition means for igniting the enriched air-fuel mixture in said auxiliary combustion chamber while the working chamber from which the lean air-fuel mixture was obtained remains open to said outlet of said auxiliary combustion chamber, flame arrestor means between said fuel injector means and said check valve means for preventing flame in said auxiliary combustion chamber from progressing through said check valve means while open and then said inlet into said working chambers as they are contracting, and said housing means having an exhaust port open to said cavity at a location so as to be opened past said rotor to said working chambers as they contract in an exhaust phase.

2. A rotary combustion engine comprising housing means having opposing end walls and a peripheral wall cooperatively defining a cavity, a crankshaft rotatably supported in said housing means having an eccentric located in said cavity, means for providing a fixed speed ratio between said rotor and said crankshaft so that said crankshaft is caused to rotate as said rotor executes planetary motion with a fixed cyclic relationship of three crankshaft revolutions for each rotor revolution, said peripheral wall having two lobes with two cusps and said rotor having three lobes with three apexes cooperatively defining with said end walls three working chambers that are spaced about and move with said rotor while varying in volume as said apexes remain adjacent said peripheral wall and reaching a minimum volume when the associated rotor lobe is opposite one of said cusps, said housing means having an intake port open to said cavity located on the leading side of the other cusp relative to rotor rotation so as to be opened past said rotor to said working chambers as they expand in an intake phase, lean air-fuel mixture supply means for supplying a lean air-fuel mixture to said intake port, said housing means further having an auxiliary combustion chamber with an inlet open to said cavity located on the trailing side of said one cusp so as to be opened past said rotor to said working chambers as they contract in a compression phase, said auxiliary combustion chamber also having an outlet open to said cavity located on the leading side of said one cusp so as to be opened past said rotor to said working chambers as they expand in an expansion phase, spring biased check valve means in said inlet for permitting the lean air-fuel mixture in said working chambers to flow into said auxiliary combustion chamber above a predetermined pressure as said working chambers are contracting and preventing flow in the opposite direction, fuel injection means for injecting fuel into the lean air-fuel mixture in said auxiliary combustion chamber downstream of said check valve means when the working chamber from which the lean air-fuel mixture has been obtained opens to said outlet of said auxiliary combustion chamber, ignition means for igniting the enriched air-fuel mixture in said auxiliary combustion chamber while the working chamber from which the lean air-fuel mixture was obtained remains open to said outlet of said auxiliary combustion chamber, flame arrestor means between said fuel injector means and said check valve means for preventing flame in said auxiliary combustion chamber from progressing through said check valve means while open and then said inlet into said working chambers as they are contracting, and said housing means having an exhaust port open to said cavity at a location on the trailing side of said other cusp so as to be opened past said rotor to said working chambers as they contract in an exhaust phase.

3. A rotary combustion engine comprising housing means having opposing end walls and a rotor housing with a peripheral wall cooperatively defining a cavity, a crankshaft rotatably supported in said housing means having an eccentric located in said cavity, means for providing a fixed speed ratio between said rotor and said crankshaft so that said crankshaft is caused to rotate as said rotor executes planetary motion with a fixed cyclic relationship of three crankshaft revolutions for each rotor revolution, said peripheral wall having two lobes with two cusps and said rotor having three lobes with three apexes cooperatively defining with said end walls three working chambers that are spaced about and move with said rotor while varying in volume as said apexes remain adjacent said peripheral wall and reaching a minimum volume when the associated rotor lobe is opposite one of said cusps, said housing means having an intake port open to said cavity located on the leading side of the other cusp relative to rotor rotation so as to be opened past said rotor to said working chambers as they expand in an intake phase, lean air-fuel mixture supply means for supplying a lean air-fuel mixture to said intake port, said rotor housing having a peripherally extending auxiliary combustion chamber with an inlet in said peripheral wall open to said cavity located on the trailing side of said one cusp so as to be opened past said rotor to said working chambers as they contract in a compression phase, said auxiliary combustion chamber also having an outlet in said peripheral wall open to said cavity located on the leading side of said one cusp so as to be opened past said rotor to said working chambers as they expand in an expansion phase, spring biased check valve means in said inlet for permitting the lean air-fuel mixture in said working chambers to flow into said auxiliary combustion chamber above a predetermined pressure as said working chambers are contracting and preventing flow in the opposite direction, fuel injection means for injecting fuel into the lean air-fuel mixture in said auxiliary combustion chamber downstream of said check valve means immediately after the working chamber from which the lean air-fuel mixture has been obtained opens to said outlet of said auxiliary combustion chamber, ignition means for igniting the enriched air-fuel mixture in said auxiliary combustion chamber while the working chamber from which the lean air-fuel mixture was obtained remains open to said outlet of said auxiliary combustion chamber, flame arrestor means between said fuel injector means and said check valve means for preventing flame in said auxiliary combustion chamber from progressing through said check valve means while open and then said inlet into said working chambers as they are contracting, and said housing means having an exhaust port open to said cavity at a location on the trailing side of said other cusp so as to be opened past said rotor to said working chambers as they contract in an exhaust phase.

4. A rotary combustion engine comprising housing means having opposing end walls and a peripheral wall cooperatively defining a cavity, a crankshaft rotatably supported in said housing means having an eccentric located in said cavity, means for providing a fixed speed ratio between said rotor and said crankshaft so that said crankshaft is caused to rotate as said rotor executes planetary motion with a fixed cyclic relationship, said peripheral wall and said rotor cooperatively defining with said end walls a plurality of working chambers that are spaced about and move with said rotor while varying in volume, said housing means having an intake port open to said cavity located relative to rotor rotation so as to be opened past said rotor to said working chambers as they expand in an intake phase, lean air-fuel mixture supply means for supplying a lean air-fuel mixture to said intake port, said housing means further having an auxiliary combustion chamber with an inlet open to said cavity located so as to be opened past said rotor to said working chambers as they contract in a compression phase and having an outlet open to said cavity located so as to be opened past said rotor to said working chambers as they expand in an expansion phase, check valve means in said inlet for permitting the lean air-fuel mixture in said working chambers to flow into said auxiliary combustion chamber above a predetermined pressure as said working chambers are contracting and preventing flow in the opposite direction, fuel injection means for injecting fuel into the lean air-fuel mixture in said auxiliary combustion chamber downstream of said check valve means after the working chamber from which the lean air-fuel mixture has been obtained opens to said outlet of said auxiliary combustion chamber, ignition means for igniting the enriched air-fuel mixture in said auxiliary combustion chamber while the working chamber from which the lean air-fuel mixture was obtained remains open to said outlet of said auxiliary combustion chamber, and said housing means having an exhaust port open to said cavity at a location so as to be opened past said rotor to said working chambers as they contract in an exhaust phase.

* * * * *

UNITED STATES PATENT OFFICE
CERTIFICATE OF CORRECTION

PATENT NO. : 3,868,930

DATED : March 4, 1975

INVENTOR(S) : Edward D. Klomp, James H. Wolgemuth, Harold V. Wiknich

It is certified that error appears in the above-identified patent and that said Letters Patent are hereby corrected as shown below:

Column 5, line 35, after "cavity," insert -- means --.

Signed and sealed this 17th day of June 1975.

(SEAL)
Attest:

RUTH C. MASON
Attesting Officer

C. MARSHALL DANN
Commissioner of Patents
and Trademarks